Oct. 25, 1966  D. E. HULL  3,280,524
WIND BREAKER TO PREVENT ROOF DAMAGE
Filed Nov. 14, 1963

INVENTOR.
D. E. HULL
BY Young and Quigg
ATTORNEYS

United States Patent Office 3,280,524
Patented Oct. 25, 1966

3,280,524
WIND BREAKER TO PREVENT ROOF DAMAGE
Donald E. Hull, Woods Cross, Utah, assignor to Phillips Petroleum Company, a corporation of Delaware
Filed Nov. 14, 1963, Ser. No. 323,715
1 Claim. (Cl. 52—173)

This invention relates to a wind breaker to prevent roof damage. In one aspect the invention relates to a means for converting laminar or streamline wind flow to turbulent or eddy wind flow.

Storage tanks, such as tanks for petroleum products, are generally situated in open areas exposed to wind and storm. High velocities of wind of from 40 to 100 miles per hour are not uncommon in many areas of the country. The passage of this high velocity wind over a roof creates an area or locus of low pressure on the roof surface which may result in the removal of at least a portion of the roof covering. A schematic diagram illustrating this area of low pressure is shown in FIGURE 1. This problem is particularly severe if the storage tank has a conical shaped roof or a roof having a center which is raised relative to the peripheral portion of the storage tank. However, the problem is existent even with flat roofs or umbrella shaped roofs, although the damage is generally less.

It is an object of the invention to provide apparatus for minimizing the damage to roof coverage due to wind.

It is another object of the invention to provide apparatus for converting laminar wind flow to turbulent wind flow.

It is yet another object of the invention to provide a device for protecting roofs.

These and other objects of the invention will be readily apparent to those skilled in the art from the accompanying disclosure, appended drawing and claims.

It has now been found that the damage due to wind and storm can be drastically reduced by the positioning on the peripheral portion of the roof of a means for converting high velocity laminar or streamline wind flow to turbulent or eddy flow, thereby eliminating the locus of low pressure on the roof and thus reducing loss of roof coverings.

In one embodiment the means for converting laminar wind flow to turbulent flow comprises a baffle disposed on the peripheral portion of the windward of the roof.

Figure 1:
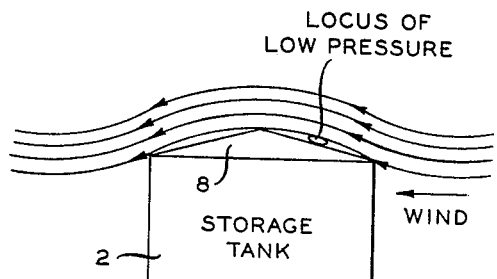
FIGURE 1 is a schematic diagram showing the effect of a wind on a storage tank.
Figure 2:
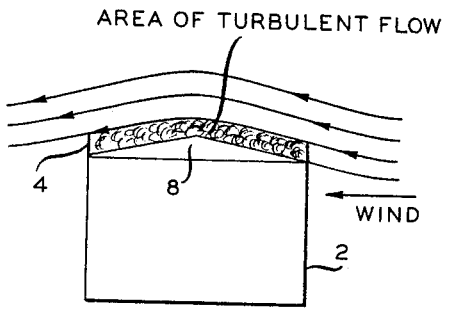
FIGURE 2 is a schematic diagram illustrating the effect of the inclusion of a baffle on the peripheral portion of the storage tank.
Figure 3:
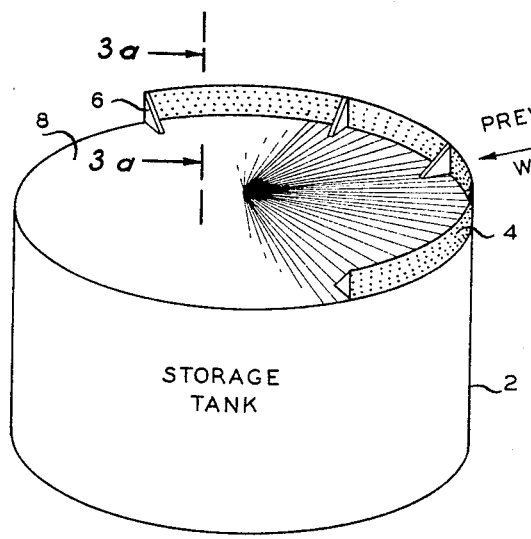
Figure 3A:
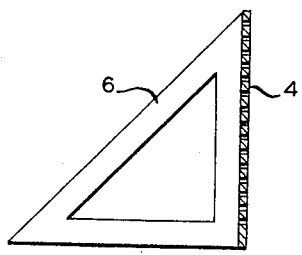

FIGURE 3 is a diagram illustrating a perforated baffle on the peripheral portion of a storage tank. FIGURE 3A better illustrates the perforated baffle and its support. FIGURE 3a is a cross-sectional view of the perforated baffle with its support, taken along line 3a—3a of FIGURE 3.

Figure 4:
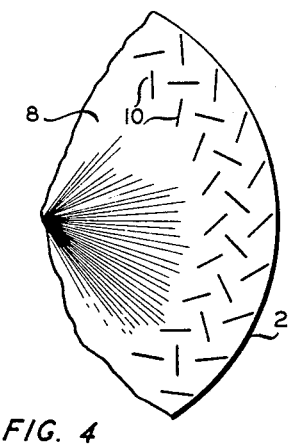

FIGURE 4 is a schematic diagram showing the attachment of louvers to the peripheral portion of a storage tank.

Figure 5:
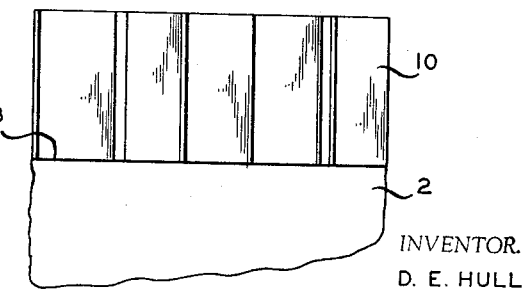

FIGURE 5 is a side view of the louvers of FIGURE 4.

Although the invention is best described herein with reference to a petroleum product storage tank, it is obvious that the invention is applicable to any type of roof having a problem of low pressure due to high wind velocities which will remove the roof covering.

A particularly suitable baffle is shown in FIGURE 3. This may be any sort of a perforated member 4, such as a 16-gauge perforated aluminum sheet having ½ inch diameter holes on a ¾ inch equilateral triangular spacing. Bracing 6 is provided as shown in the drawing. Preferably this bracing is attached to the roof 8 so as to prevent its dislodging due to high velocity winds. On about a 100-foot diameter storage tank 2, a baffle approximately 15 inches in height is satisfactory. The height of the baffle depends upon the height of the storage tank roof but it is generally from 6 inches to 5 feet in height. It has been observed that the low pressure zone develops on the tank roof at a distance of approximately 5 to 10 feet from the outside edge of a 100-foot diameter conically roofed tank. It is generally preferred that the baffle be positioned at the extreme peripheral portion of the roof, but it is within the scope of the invention to position the baffle at any position which will break up the laminar wind flow and produce a turbulent wind flow above the tank roof. Thus, positioning of the baffle 5 feet from the roof edge is satisfactory. The baffle may be inclined up to 45 degrees from the vertical. The perforations must be sufficient to permit the passage of the wind through the baffle and also sufficient to break up the laminar air flow and make it turbulent. Generally, the baffle should have about 30 to about 90 percent aperture area with respect to the total area, and have sufficient support to prevent its being removed from the tank during the wind flow.

Instead of a perforated sheet, a series of louvers 10 are employable, such as a series of vertical or inclined members around the periphery of the tank 2. These louvers, as well as perforated member 4, may also be set at an angle such as up to about 45 degrees. Several rows of plates are arranged so that the maximum disturbance of flow is obtained. Again assuming a 100-foot diameter storage tank, a suitable size of louvers would be 1 and ½ feet high by 1 foot wide by ¼ inch thick. The louvers are spaced to permit a 6 inch passageway for the wind flow.

The drawings illustrate the baffle as being on the windward side of the storage tank 2. However, it is also within the scope of the invention to include the baffle around the entire peripheral portion of the storage tank or any portion thereof. It is only necessary that the perforated baffle be on the side of the prevailing wind; however, if the area has no prevailing wind or it is uncertain which direction a damaging wind might come from a baffle around the entire peripheral portion of the tank would prevent damage from any wind.

The thickness of the baffle is of no consequence. The only consideration is that it be strong enough to resist the wind flow.

In a practical application a petroleum storage tank having a diameter of about 100 feet and which had suffered wind losses amounting to $28,000 on roof coverings alone during 3½ years was improved by the addition of a perforated baffle as hereinbefore described in FIGURE 3 on the windward side. Subsequently the storage tank roof was subjected to a wind of 63 miles per hour and no damage occurred to the roof, although similar roofs on similar storage tanks sustained 20 percent losses of sheet metal and insulation.

Although the invention is described with reference to

I claim:

Apparatus for protecting a circular storage tank from roof damage, said roof being conically shaped and having a raised center portion higher than the peripheral portion and subjected to high velocity wind flow which creates a low pressure area on a portion of said roof, comprising in combination, said storage tank and an upright perforated member attached to the periphery of said roof and extending around a substantial portion of the periphery of said roof on the windward side and containing a multiplicity of apertures to permit the wind to flow therethrough while converting laminar wind flow to turbulent flow thus substantially eliminating the area of reduced pressure.

References Cited by the Examiner
UNITED STATES PATENTS

| | | | |
|---|---|---|---|
| 2,206,040 | 7/1940 | Ludington | 52—173 |
| 2,270,537 | 1/1942 | Ludington | 52—24 |
| 2,270,538 | 1/1942 | Ludington | 52—173 |
| 2,381,951 | 8/1945 | Ibarra | 244—113 |
| 2,618,401 | 11/1952 | Wilkin | 52—245 |
| 3,040,734 | 6/1962 | Field | 98—62 |

FRANK L. ABBOTT, *Primary Examiner.*

M. O. WARNECKE, *Assistant Examiner.*